United States Patent [19]

Brenna et al.

[11] Patent Number: 5,673,491
[45] Date of Patent: Oct. 7, 1997

[54] CRANE LEVEL INDICATOR DEVICE

[76] Inventors: Douglas J. Brenna; Shirley A. Brenna, both of 1873 N. Ruby Ct., Eagan, Minn. 55122

[21] Appl. No.: 545,918

[22] Filed: Oct. 20, 1995

[51] Int. Cl.$^6$ .................................................. G01C 9/14
[52] U.S. Cl. ........................... 33/366; 33/333; 33/391; 33/392
[58] Field of Search ........................ 33/366, 333, 370, 33/371, 391, 392, 398, 401

[56] References Cited

U.S. PATENT DOCUMENTS

| | | | |
|---|---|---|---|
| 2,338,811 | 1/1944 | Hasbrook | 33/366 |
| 2,633,028 | 3/1953 | Fillebrown | 33/366 |
| 2,759,272 | 8/1956 | Rickert. | |
| 2,930,138 | 3/1960 | Coste | 33/366 |
| 3,096,655 | 7/1963 | Peterson | 33/366 |
| 3,865,265 | 2/1975 | Brudi et al. | 33/366 |
| 3,975,831 | 8/1976 | Jysky et al. | 33/366 |
| 4,571,844 | 2/1986 | Komasaku et al. | 33/366 |
| 4,584,778 | 4/1986 | Komasaku et al. | 33/366 |
| 4,658,508 | 4/1987 | Oberg | 33/366 |
| 4,760,649 | 8/1988 | Preston et al. | 33/333 |
| 4,887,359 | 12/1989 | Hofius | 33/366 |
| 5,065,522 | 11/1991 | Motoda et al. | 33/366 |
| 5,136,784 | 8/1992 | Marantz | 33/366 |

*Primary Examiner*—Christopher W. Fulton
*Attorney, Agent, or Firm*—Palmatier, Sjoquist, Helget, & Voigt, P.A.

[57] ABSTRACT

Disclosed is a level indicator device for cranes. A sensor sending unit fixed to the crane base utilizes a free swinging pendulum with a tip which activates sensor portions on a sensor board. An out-of-level attitude of the crane tilts the sensor sending unit and thus moves the pendulum tip to contact a specific sensor portion defined by the crane attitude. The sensors are connected to circuitry including a programmable array logic chip which generates a signal representative of a binary number corresponding to the position of the particular sensor activated. A serial to parallel converter converts the parallel binary number to a serial number and transmits radio frequency signals with said serial binary number indicative of the pendulum position. The RF signal is received by a receiver indicator unit located in the operator control station of the crane. Circuitry converts the signals to indicator activating signals for an indicator panel on the receiver indicator unit. The indicator panel displays the direction and degree of tilt of the crane base by appropriately positioned visual indicators laid out in quadrants to incrementally indicate the degree and direction of the crane tilt whereby the crane operator may operate the crane leveling controls.

8 Claims, 4 Drawing Sheets

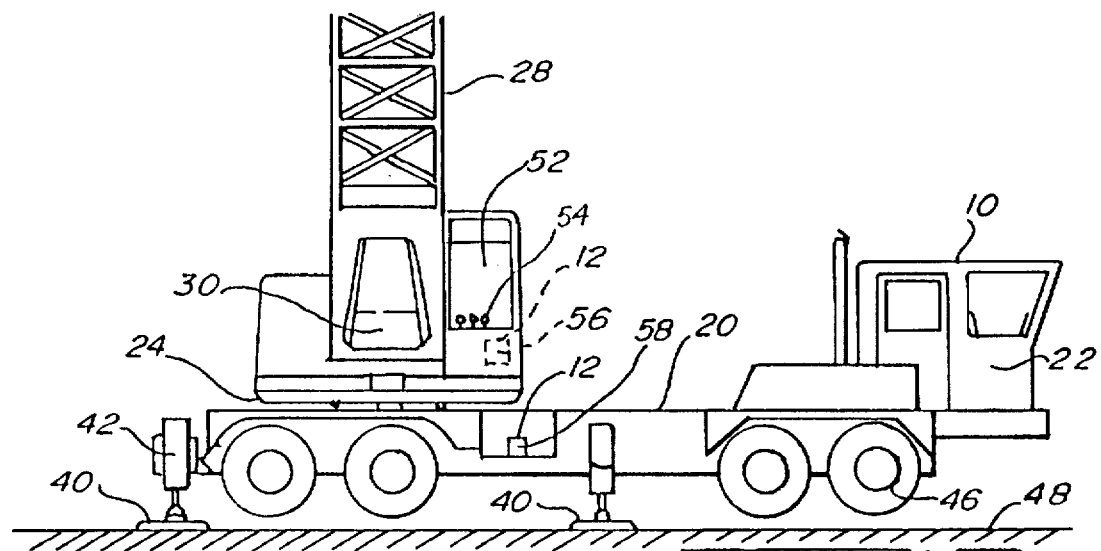
Fig. 1a.
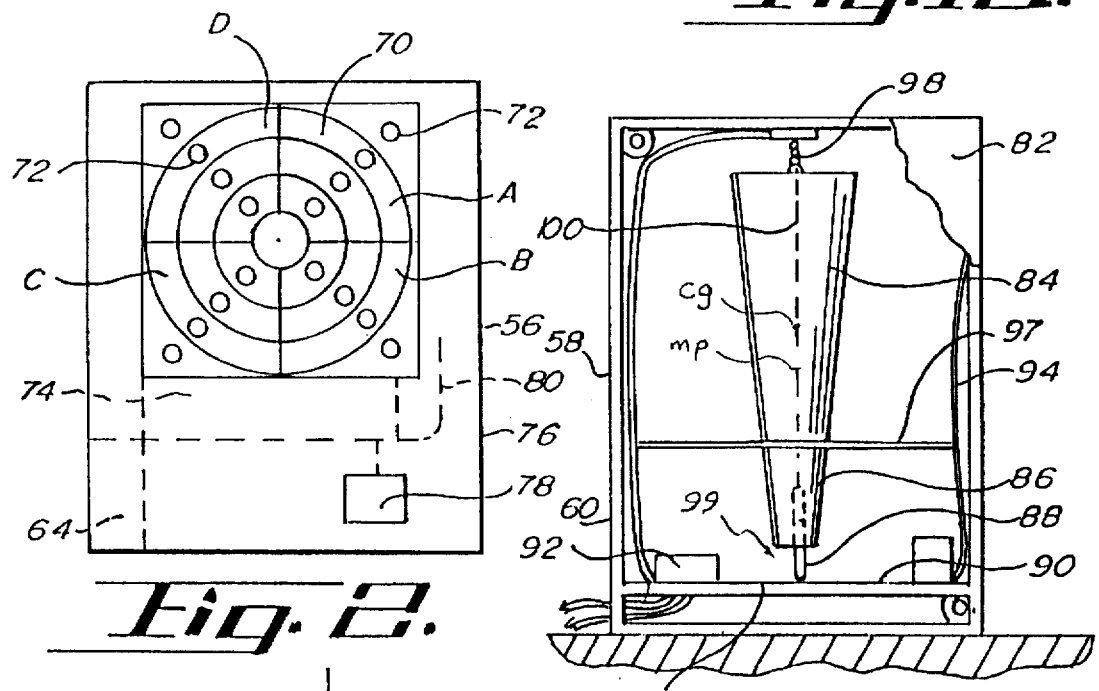
Fig. 2.
Fig. 3.
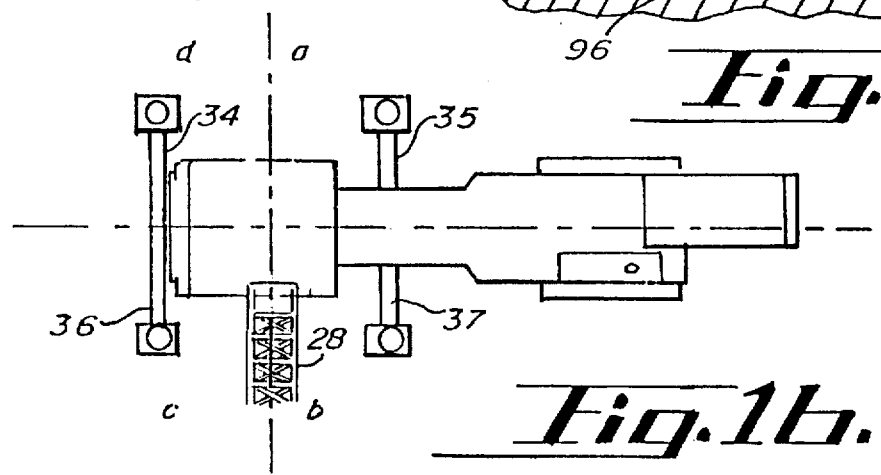
Fig. 1b.

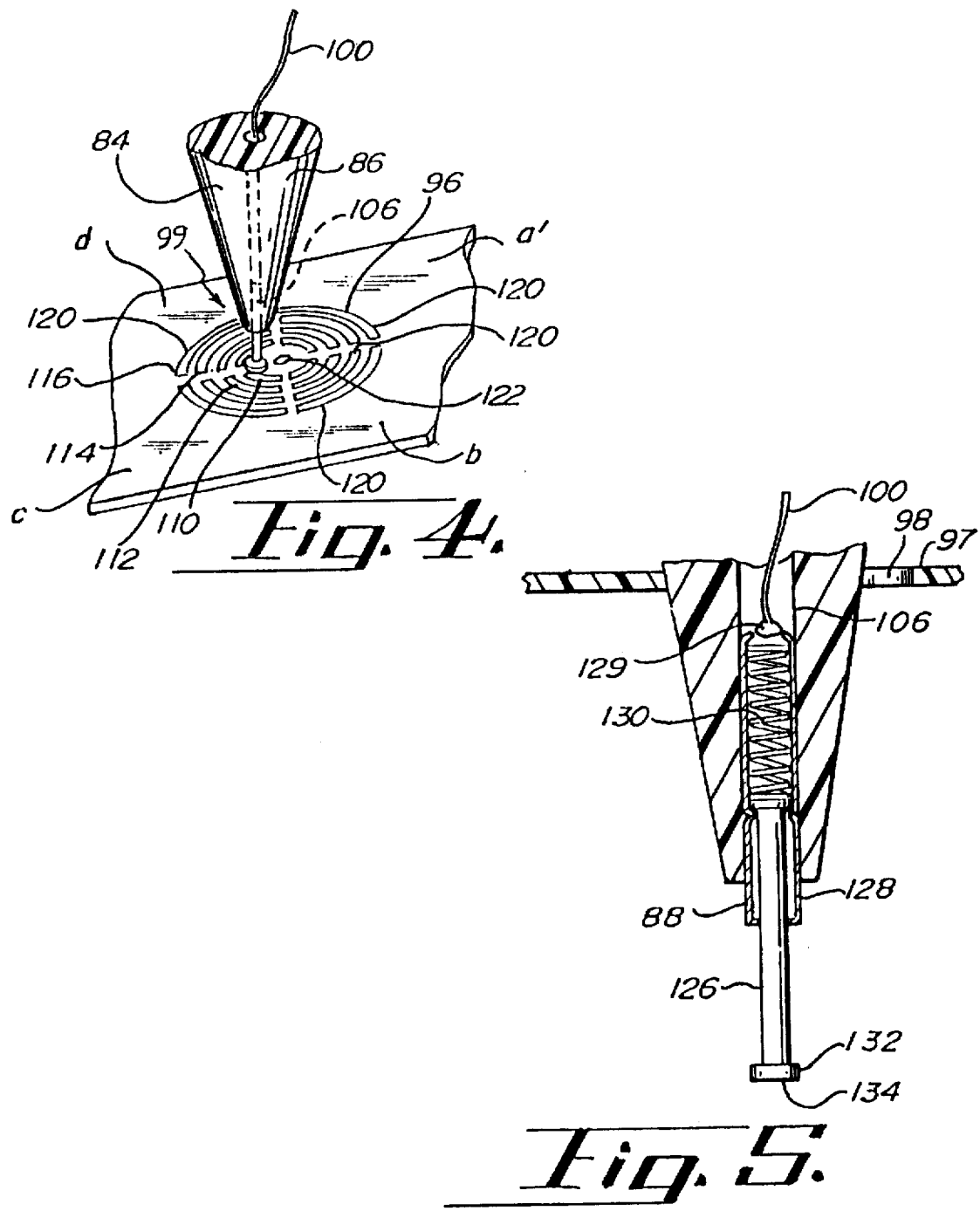

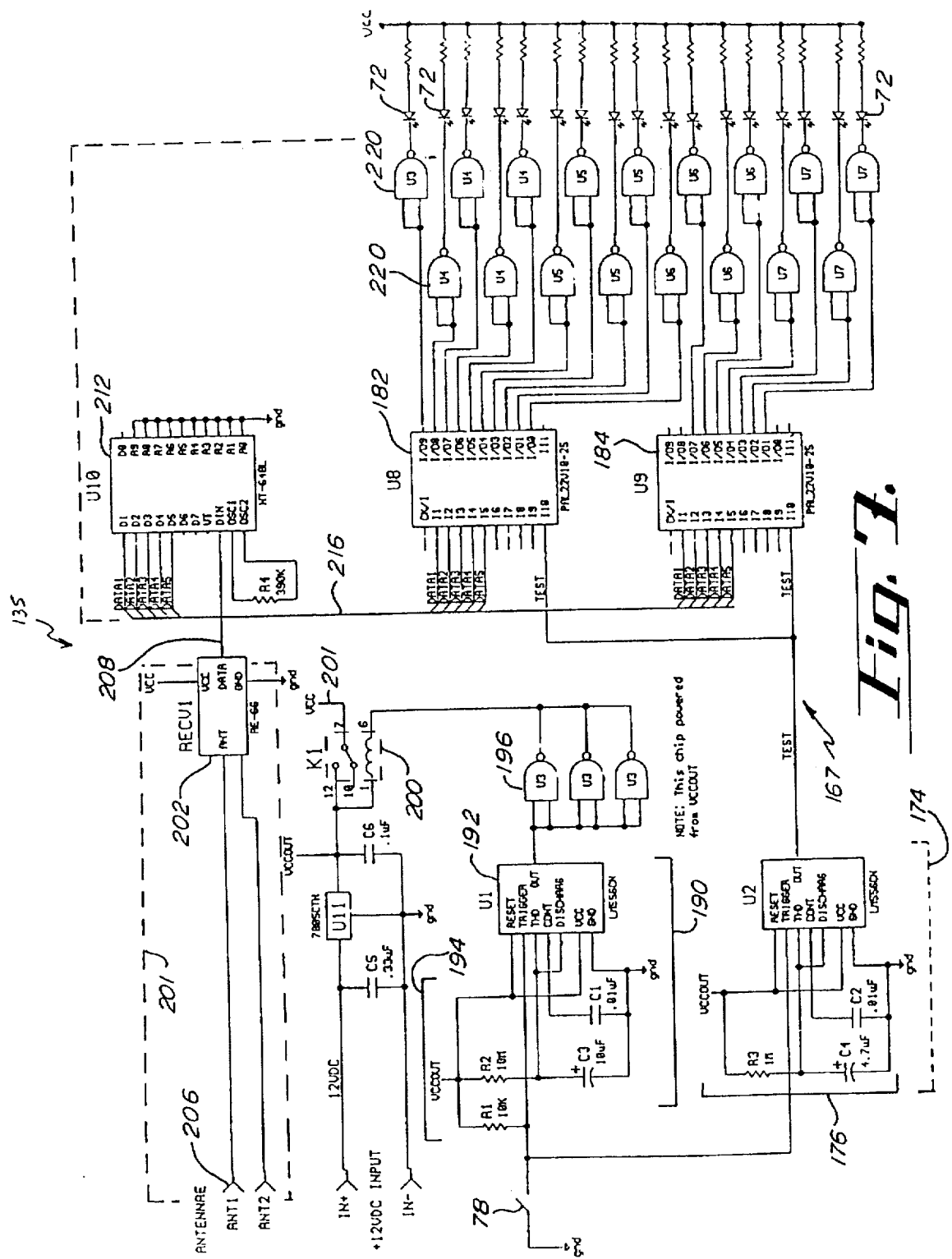

CRANE LEVEL INDICATOR DEVICE

BACKGROUND OF THE INVENTION

This invention relates to leveling devices. More relates to a setup leveling device for mobile cranes.

Mobile cranes are a very common piece of construction and material handling equipment and come in various configurations and with a wide range of lifting capacities. Cranes typically have a frame which may be positioned on an operating surface, a turret which is at least partially rotatable on said frame and a boom extending from the turret. The turret will also have draw works with cabling extending the length of the boom for raising and lowering loads. Typically a cab with an operator station will also be placed on the turret whereby the operator position is rotated as the turret is rotated allowing for maximum visibility and ease of operation of the various controls. Typically outriggers with hydraulic adjustment pads will extend from the frame for leveling during setup and providing support for the crane during operation.

The load capacity of a particular crane can be severely limited by the extent that the crane is out of level. A typical way that the levelness of a crane is now checked at setup is by use of a leveling plate positioned on the crane turret and a carpenter's level. The use of such a method is somewhat awkward in that it typically requires two people, one reading the level and the other operating the leveling controls. Additionally, the leveling plates are setup such that the carpenter's level may only be placed in a single direction with respect to the turret requiring the turret to be rotated 90° to check the extent of levelness of all four quadrants or both axis. Alternately, the degree of level of a crane may be checked by observing the hoist cable in comparison to the center line of the boom at different turret positions. This methodology can be a problem in windy conditions or where the hoist cable is long and as such has a tendency to swing.

Alternately some cranes utilize a bubble leveling device located directly in the cab of the crane. In such devices the sensor is the bubble and the indicator is also the bubble. This device is extraordinary simple in operation but has several disadvantages. The bubble may be difficult to read with any degree of accuracy and the reading may be somewhat subjective depending on the operator. Moreover, the exposed location of the bubble unit subjects the device to damage and also may not accurately reflect the actual tilt of the crane frame. That is, the location of the sensor in the operator station will show the tilt of the operator station rather than the more appropriate tilt of the crane frame.

The out-of-level condition of a crane can lead to an overload condition and a potentially catastrophic accident.

SUMMARY OF THE INVENTION

Disclosed is a level indicator device for cranes. A sensor sending unit fixed to the crane base utilizes a free swinging pendulum with a tip having a sensor activator which activates individual sensor portions on a sensor board. An out-of-level attitude of the crane tilts the sensor sending unit and thus moves the pendulum tip to a specific sensor portion defined by the crane attitude. The sensors are connected to circuitry including a programmable array logic chip which generates a signal representative of a binary number corresponding to the position of the particular sensor activated. A serial to parallel converter converts the parallel binary number to a serial number and transmits radio frequency signals with said serial binary number indicative of the pendulum position. The RF signal is received by a receiver indicator unit located in the operator control station of the crane. Circuitry converts the signals to indicator activating signals for an indicator panel on the receiver indicator unit. The indicator panel displays the direction and degree of tilt of the crane base by appropriately positioned visual indicators laid out in quadrants to incrementally indicate the degree and direction of the crane tilt whereby the crane operator may operate the crane leveling controls.

In a preferred embodiment the tip of the pendulum with the sensor activator contacts physically and electrically the individual sensor portions. This contact provides a frictional resistance to the movement of the pendulum thus providing a dampening action for the swinging of the pendulum.

An object and advantage of the invention is that the pendulum is shaped to raise the center of gravity upwardly from the tip toward the pivot point of the pendulum. This shortens the effective length of the pendulum thus shortening the pendulum period of oscillation and quickening the response time of the pendulum. Moreover, the actual length of the pendulum being greater than the effective length provides increased selectivity of the tip in engaging the sensor portions.

A further advantage of the invention is that the configuration of the tip provides a resistance to the movement of the pendulum on the sensor board thereby providing a dampening effect on the free swinging of the pendulum.

BRIEF DESCRIPTION OF THE DRAWINGS

FIG. 1a is a side elevational view of a mobile crane with the invention in place.

FIG. 1b is a plan view of a crane showing the four quadrants.

FIG. 2 is a front elevational view of the receiver indicator unit.

FIG. 3 is a front elevational view of the sensor sender unit with a portion of the cover removed revealing the conical pendulum.

FIG. 4 is a partial detail view showing the tip of the pendulum with the sensor activator engaging the sensor board.

FIG. 5 is a sectional view of the tip of the pendulum with the sensor activator.

FIG. 7 is a schematic diagram of a circuitry for the receiver indicator unit.

DETAILED DESCRIPTION OF THE PREFERRED EMBODIMENTS

Figures 6A, 6B:
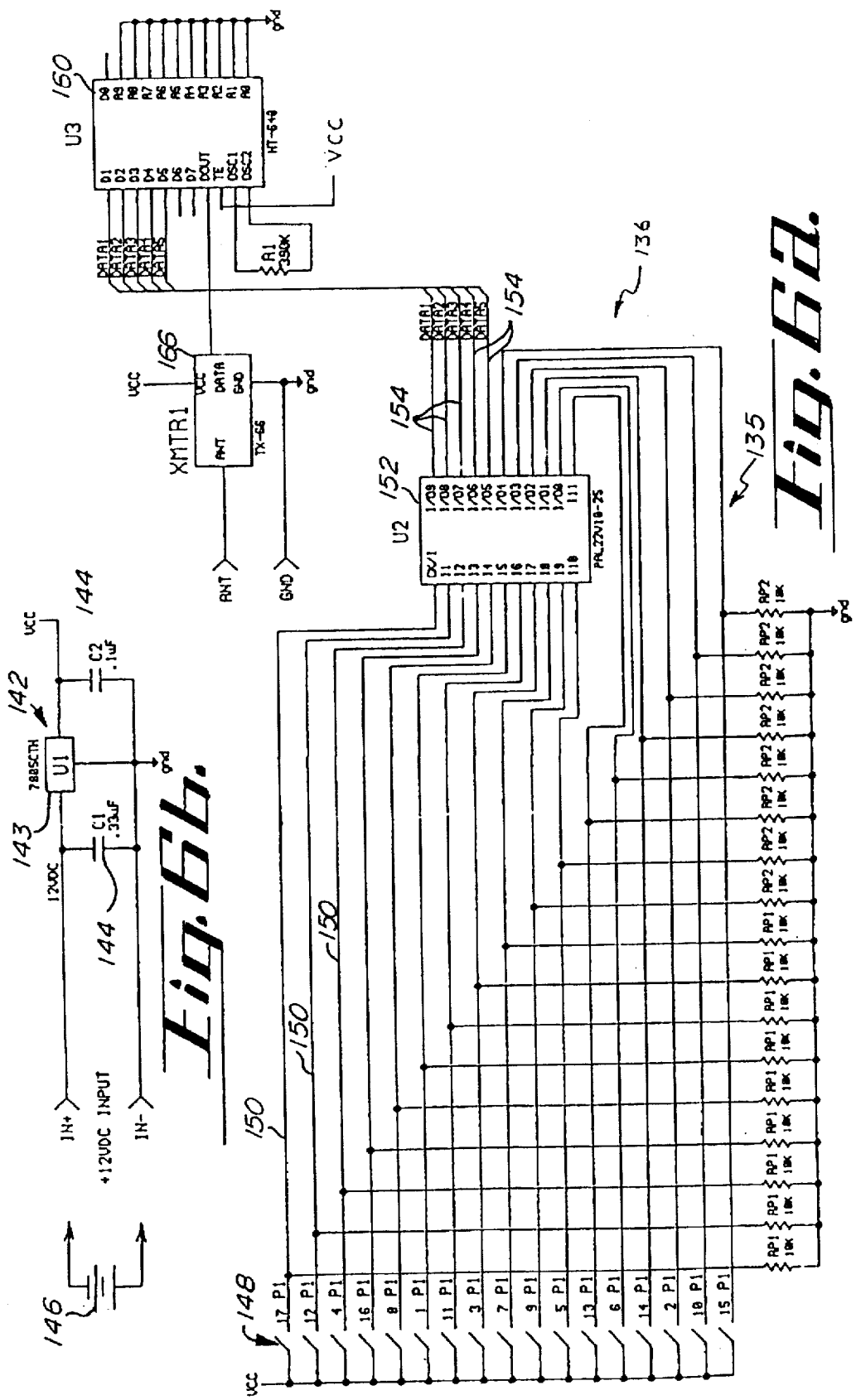
FIG. 6a is a schematic diagram of the circuitry for the sensor sending unit.
FIG. 6b is a schematic diagram of the power supply for said unit.

Referring to FIGS. 1a and 1b, a generic mobile crane 10 is shown with the level indicator device generally indicated by the numeral 12.

The crane has a frame 20, a rotatable turret 24, a boom 28, draw works 30, and four outriggers 34, 35, 36, 37. Referring specifically to FIG. 1b, the crane thus has four quadrants labeled a, b, c, d which correspond to the four outriggers. Each of the outriggers has a pad 40 and is adjustable vertically by way of an adjustment means 42 such as hydraulic cylinders or a manual jacking mechanism. During the adjustment process the tires 46, as shown in FIG. 1, are elevated off the ground or operating surface 48 to provide a firm four-point foundation at each of the outrigger pads 40. The turret 24 rotates on the frame 20. As it rotates the boom 28, draw works 30, and an operator station 52 with control levers including level adjusting controls 54 correspondingly rotate.

Referring to FIGS. 1a, 2 and 3, the level indicator device 12 is shown with its two principle portions being the receiving indicator unit 56 and a remote transmitter sensor unit 58. The receiver indicator unit 56 is typically positioned at the operating station 52 in the rotatable turret 24. Alternatively, it may be located wherever the operator controls are located for the level adjustment such as the hydraulic controls for the outriggers 24, 25, 26 and 27. In this regard the receiving indicator unit may also be portable and utilize a self-contained battery 64 as an alternative to the crane power. In a situation that requires individual adjustment at each outrigger the receiver indicator unit may be carried to each individual adjustment mechanism 42. Referring to FIG. 2, the receiving indicator unit 56 has a display panel 70 with a plurality of individual visual indicators 72 such as light emitting diodes. The visual indicators are arranged in four quadrants labeled A, B, C, and D. These correspond to the four quadrants a, b, c, and d of the crane 10 as shown in FIG. 1b. The receiving indicator unit 56 utilizes circuitry 74, shown in detail in FIG. 7, enclosed in a housing 76. The unit is activated by way of a push-button switch 78 and has an internal antenna 80.

Referring to FIG. 3, the remote sensor unit 58 is shown having a housing 80 with a front cover 82 shown broken away to reveal the pendulum 84 with a tip 86, a sensor activator 88 on the tip, and a sensor board 90. The sensor board 90 includes the sensor unit circuitry 92 with a transmitting antenna 94 and positioned on the board under the pendulum is a sensing region 96. A pendulum restraint 97 has an aperture 98 through which the pendulum 84 extends to limit the range of the pendulum swing. The pendulum has a midpoint mp and a center of gravity cg positioned above the midpoint shortening the period of oscillation of the pendulum discussed in further detail below. The sensing region 96 and the sensor activator 88 comprise a position sensor 99 for the pendulum.

Pendulum 84 is supported by a short electrically conductive line 98 suitably suspended from the housing 80. The electrically conductive line 98 is electrically connected by way of a wire 100 to the sensor activator or contact member 88 which is engaged with the sensing region 96.

Referring to FIGS. 4 and 5, details of the tip 87 of the pendulum 84 and the sensing region 96 are depicted. The contact member 88 is suitably inserted such as by press fitting or by way of threads in a bore 106 extending axially into the pendulum 84. The sensing region 96 is comprised of a plurality of degree-of-tilt indicating concentric rings 110, 112, 114, 116. Each concentric ring 110, 112, 114, 116 is divided into four quadrants identified by a', b', c', d' by an "x" axis and a "y" axis. The x and y axis define individual out-of-level sensor portions 120. At the center point of the quadrants is a central no tilt or in-level sensor portion 122 which will be contacted by the tip when the sensor unit is level. The sensing region may be conventionally formed as part of a printed circuit board with traces as the sensor portions. As shown, the sensor board 90 and sensing region 96 are substantially planar. Alternatively, they can be configured in a concave shape to follow the arc of the swinging pendulum.

FIG. 5 shows details of a suitable sensor activator or contact member 88 at the tip 86 of the pendulum 84. The conical shape of the pendulum reduces the effective length of the pendulum in that the period of oscillation of a pendulum is controlled by the relationship of $T=2\pi\sqrt{(L/G)}$, with T representing the period of oscillation, L being the effective length of the pendulum, and G being the gravitational constant. Reduction of the effective length thus shortens the period of oscillation which in turns quickens the response time of the pendulum. However with an actual pendulum length greater than the effective length the increased selectivity or sensitivity is provided. In addition to using a contact member as a sensor activator, alternate means such as a light generating member may be utilized with the sensor portions configured as light sensitive sensors. In that in the embodiment disclosed the sensing region 96 that is substantially planar, the pendulum 88 must be so designed to maintain contact throughout its various arcs with each of the individual sensor portions 120, 122. This may be facilitated such as by way of a spring 130 loading a plunger 126 slidably engaged in a housing 128. The spring 130 is of sufficient weakness so as to create minimal friction when sliding across the sensing region as the pendulum swings. However, the spring 130 is of sufficient strength so as to maintain contact with the sensing region 96 and to provide some resistance to the movement of the contact member 88 across the sensing region 96 to provide a dampening effect on the swinging of the pendulum. A suitable spring force has been found to be 0.1 to 0.2 ounces. The wire 100 is suitably attached to the contact member by way of solder 129 or other suitable means. The plunger 126 has a contact foot 132 which has a smooth conical lower surface 134 for engaging the sensing region 96. Alternatively, other sensor activators contacts may be used such as a conductive brush contact, or conductive roller contact.

The device circuitry 135 is shown in FIGS. 6a, 6b, and 7. Referring to FIG. 6a and 6b, a schematic diagram for the circuitry 136 of the transmitter sensor unit is shown. Specifically, FIG. 6b shows the power supply 142 with filter capacitors 144 for the unit and comprises a conventional voltage regulator device 143 and is typically connected to the 12 volt power supply 146 of the crane.

Referring to FIG. 6a the pendulum contact member and the sensing region 96 with individual sensor portions is represented by the bank of switches identified by the numeral 148. Each of the sensor portions 120, 122 are connected by way of conductors 150 to a programmable array logic (PAL) chip 152. Said chip is suitably programmed by conventional means to provide a binary number corresponding to each specific sensor portion 120, 122 on the sensor board. The output of the PAL chip 152 is in parallel through the data output lines 154. The parallel data lines 154 connect to a conventional parallel to serial data converter 160 whose output is connected to the transmitter chip 166. The parallel to serial converter 160 is configured to continually send out serial data bursts indicative of the input binary number. Thus the transmitter chip 166 similarly continually transmits an amplitude modulated RF signal indicative of the binary number of the sensor portion 120, 122 in contact with the pendulum contact member 88. The power drain on the circuitry for the transmitter sender sensor unit 58 is in the milliwatt range and therefore may remain in continuous operation without significant battery drain.

Referring to FIG. 7, a schematic diagram of the receiver indicator unit circuitry 167 is shown. In that this unit will have substantially more current drain than the transmitter unit, due primarily to the LED's, it is configured to have intermittent operation triggered by the depression of the push-button switch 78. Moreover, the invention is intended as a setup device for cranes as opposed to a continual monitoring device. Activation of the switch 78 initially activates time circuit 174 which is comprised of a conventional 556 timer which sends out a two second pulse controlled by the capacitor resistor network 176. The test signal is connected to the pair of programmable array logic chips 182, 184 to activate all of the LED's 186. The second timer circuit 190 is comprised of a 556 timer chip 192 and a capacitor/resistor network 194. The timer circuit 120 triggers NAND gates 196 to drive the relay 200. The relay 200 switches on and off the VCC power source 201. The timer circuitry 190 may be set for a suitable period of time such as three minutes to allow appropriate amount of time for adjustment of the leveling devices on the crane. The receiver circuitry 167 has a receiver portion 202 comprised of a receiver chip 202 suitably matched with the transmitter chip 166 of the transmitter sensor unit 58. An antenna 206 accepts the RF signal which is demodulated by the receiver chip 202 to a data output signal on data line 208 which goes to the serial/parallel converter chip 212. The parallel binary data output of said signal goes by way of signal lines 216 to the programmable array logic chips 182, 184 whereby they are converted into an activating signals for the LED's 72. NAND gates 220 are utilized as drivers for the LED's and are powered by the VCC power soure 20. The LED's 72 are arranged as shown in FIG. 2. PAL chips are available from Lattice Semiconductor Corp., 555 NE Moore Court, Hillsboro, Oreg. 97124. The PAL 22V10-25 is suitable for use in both the transmitter sensor unit 58 and the receiver indicator unit 56. The PAL chips are conventionally programmed using a logic programmer. Specifications and programming information is available from Lattice Semiconductor Corp. Suitable receiver and transmitter chips are available from Ming Engineering and Products, Inc. Suitable RF receivers are the RE66 3310 Mz AM Receiver and the a suitable transmitter chip is a TX66 3310 Mz AM RF transmitter.

The device operates as follows: The remote transmitter sensor unit 58 is suitably installed on the frame 20 of the crane either on the undercarriage portion or on the turret frame. The sensor portion must be suitably aligned such that the contact member 88 is engaged with the central level indicating sensor. Moreover each of the quadrants a', b', c', d' should be suitably aligned with the quadrants a, b, c, d of the crane. The receiver indicator unit 56 is placed in the operator station 52 or other location where the controls for the level adjusters are located. The push-button 78 of the receiver indicator unit is depressed and after a short illumination of all of the lights to check the operation, the light indicating the positioning of the pendulum sensor activator on the sensor board 96 will be illuminated and the leveling controls may thus be operated to tilt the crane appropriately whereby the pendulum contact member 88 contacts the central level position indicating portion 122 thus indicating the level attitude of the crane. In a crane without powered leveling controls, the receiver indicator unit 56 may be carried to the wheels, tracks, or frame where blocking or other leveling operations are carried out.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A level indicator device for a crane, of the type which is positionable on an operating surface and which has a frame, an operator station, and leveling controls for adjusting the gravitational level of the crane, the level indicator device comprising:

a) a remote sensor sending unit positionable on the crane, and a receiving indicator unit placeable at the operator station, the remote sensor unit comprising:
1) a housing, the housing anchorable to the crane frame;
2) a planar sensing region fixed to the housing and comprising an in-level sensor portion and a plurality of out-of-level sensor portions;
3) a pendulum suspended in the housing and confronting the sensing region, the pendulum swingable in two axis, the pendulum having a contact member for contacting and making electrical contact with the individual sensor portions, the pendulum having an axis with the contact member axially positioned and axially moveable with a bias toward the sensing region, whereby the contact member maintains contact with the sensing region as the pendulum swings in an arc, the pendulum and sensing region configured such that the contact member activates the in-level sensor portion when the crane is level and the out-of-level sensor portions when the crane is out-of-level; and
4) sensor unit circuitry including a radio frequency transmitter portion, the circuitry connected to each sensor portion, the circuitry configured to generate and transmit signals indicative of the particular sensor portion activated by the sensor activator;

b) the receiving indicator unit comprising:
1) a display panel having a plurality of visual indicators, the visual indicators each corresponding to a particular sensor portion;
2) circuitry for receiving and processing the rf signals indicative of the sensor portion being activated, the circuitry connected to the visual indicators and configured to convert said signals into activation signals for activating the visual indicators corresponding to the activated sensor portion; and
3) a power source connected to the processing circuitry for powering said circuitry.

2. The level indicator device of claim 1 wherein the contact member is a plunger and the bias is provided by a spring engaged with the plunger.

3. A level indicator device for a crane of the type of which is positionable on an operating surface, and which has a frame with four quadrants, leveling controls for adjusting the height of each of the four quadrants of the frame with respect to the operating surface such that the crane may be leveled, the level indicator device comprised of:

a) a housing, the housing anchorable to the crane base and tiltable with said base;
b) a planar sensing region fixed to the housing and comprising an in-level sensor portion and a plurality of out-of-level sensor portions;
c) a pendulum suspended in the housing and confronting the sensing region, the pendulum swingable, the pendulum having an axis and a contact member for contacting and activating the individual sensor portions, the contact member axially moveable with a bias toward the sensing region, whereby the contact member maintains contact with the sensing region as the pendulum swings in an arc, the pendulum and sensing region configured such that the contact member activates the in-level sensor portion when the crane is level and the out-of-level sensor portions when the crane is out-of-level and wherein the pendulum is elongate with a midpoint and wherein the pendulum has a center gravity above said midpoint;

d) a display panel having a plurality of visual indicators, the visual indicators each corresponding to a particular sensor portion; and e) device circuitry connected to the sensor activator, the individual sensor portions, and the display panel, the circuitry configured to generate signals indicative of the particular sensor portion activated by the sensor activator and to activate the visual indicators corresponding to the particular sensor portion activated.

4. The level indicator device of claim 3, wherein the contact member is a plunger and the bias is provided by a spring engaged with the plunger.

5. The level indicator device of claim 3, wherein the device is further comprised of an indicator unit having the display panel and a sensor unit remote from the indicator unit containing the swinging pendulum.

6. The level indicator device of claim 5, wherein the transmitter portion further comprises a rf transmitter portion for transmitting pendulum position indicating signals and the indicator unit further comprises a cooperating rf receiver portion for receiving said signals.

7. The level indicator device of claim 6, wherein the sensor portion is comprised of four quadrants and the display panel is comprised of four corresponding quadrants.

8. The level indicator device of claim 3, wherein the pendulum is swingable in two axis.

* * * * *

UNITED STATES PATENT AND TRADEMARK OFFICE
CERTIFICATE OF CORRECTION

PATENT NO.   : 5,673,491
DATED        : October 7, 1997
INVENTOR(S)  : Douglas J. Brenna et al It is certified that error appears in the above-indentified patent and that said Letters Patent is hereby corrected as shown below:

Column 1, line 4, after "More", insert --particularly it--.

Signed and Sealed this

Thirteenth Day of January, 1998

Attest:

BRUCE LEHMAN

Attesting Officer         Commissioner of Patents and Trademarks